(12) United States Patent
Lamoncha (10) Patent No.: US 10,446,054 B2
(45) Date of Patent: Oct. 15, 2019

(54) SYSTEM AND METHOD FOR TRACKING THE WEIGHT AND FOOD CONSUMPTION OF A USER

(71) Applicant: Mark Lamoncha, Columbiana, OH (US)

(72) Inventor: Mark Lamoncha, Columbiana, OH (US)

(*) Notice: Subject to any disclaimer, the term of this patent is extended or adjusted under 35 U.S.C. 154(b) by 163 days.

(21) Appl. No.: 15/183,281

(22) Filed: Jun. 15, 2016

(65) Prior Publication Data

US 2016/0365003 A1    Dec. 15, 2016

Related U.S. Application Data

(60) Provisional application No. 62/175,651, filed on Jun. 15, 2015.

(51) Int. Cl.
| G09B 19/00 | (2006.01) |
| A43B 3/00 | (2006.01) |
| G09B 5/02 | (2006.01) |

(52) U.S. Cl.
CPC ........ *G09B 19/0092* (2013.01); *A43B 3/0005* (2013.01); *G09B 5/02* (2013.01)

(58) Field of Classification Search
CPC .......................... G09B 19/0092; A61B 5/1123
USPC ......................................................... 434/127
See application file for complete search history.

(56) References Cited

U.S. PATENT DOCUMENTS

| 5,323,650 | A | | 6/1994 | Fullen et al. |
| 5,398,688 | A | * | 3/1995 | Laniado ............. A61B 5/02438 |
| | | | | 600/437 |
| 6,122,846 | A | | 9/2000 | Gray et al. |
| 7,200,517 | B2 | | 4/2007 | Darley et al. |
| 7,353,137 | B2 | | 4/2008 | Vock et al. |
| 7,998,092 | B2 | | 8/2011 | Avni et al. |
| 8,375,784 | B2 | | 2/2013 | Bamberg et al. |
| 8,587,438 | B2 | | 11/2013 | Abernethy et al. |
| 8,764,651 | B2 | | 7/2014 | Tran |
| 2004/0131997 | A1 | * | 7/2004 | McGuire ................ G06Q 30/02 |
| | | | | 434/127 |
| 2009/0038182 | A1 | * | 2/2009 | Lans .................... A43B 3/0005 |
| | | | | 36/136 |
| 2009/0253105 | A1 | | 10/2009 | Lepine |
| 2010/0152619 | A1 | | 6/2010 | Kalpaxis et al. |
| 2010/0240962 | A1 | * | 9/2010 | Contant ................ A47G 21/02 |
| | | | | 600/300 |

(Continued)

OTHER PUBLICATIONS

Foley, James A. "Eat More Calories for Breakfast and Less Throughout the Day to Lose Weight and Lower Risk of Disease." Nature World News. Published Aug. 5, 2013. Retrieved Feb. 1, 2018. <http://www.natureworldnews.com/articles/3339/20130805/eat-more-calories-breakfast-less-throughout-day-lose-weight-lower.htm>.*

(Continued)

*Primary Examiner* — Robert P Bullington
(74) *Attorney, Agent, or Firm* — Standley Law Group LLP (57) ABSTRACT

The present invention is a system and method to monitor a user's weight and eating habits and provide feedback as a result of the monitored weight and eating habits. The system and method analyzes the monitored weight and food consumption information and when detecting a weight that exceeds an ideal user weight, provides guidance to the user in order to assist that user in the management of their eating habits and weight.

17 Claims, 8 Drawing Sheets

(56) References Cited

U.S. PATENT DOCUMENTS

| | | | |
|---|---|---|---|
| 2011/0054359 A1 | 3/2011 | Sazonov et al. | |
| 2011/0199205 A1* | 8/2011 | Kreml | A61B 5/1118 340/539.11 |
| 2011/0276312 A1 | 11/2011 | Shalon et al. | |
| 2013/0137943 A1 | 5/2013 | Pinto Rodrigues | |
| 2013/0336519 A1 | 12/2013 | Connor | |
| 2014/0347491 A1 | 11/2014 | Connor | |
| 2014/0377724 A1 | 12/2014 | Hoover et al. | |

OTHER PUBLICATIONS

Merriam-Webster Dictionary. Definition of "insole". Accessed Mar. 18, 2019 from <https://www.merriam-webster.com/dictionary/insole>.*

Etherington, D., TechCrunch, Apple Patents Smart Shoes That Feature Embedded Sensors, and Alarms for When You Need New Ones, http://techcrunch.com/2013/01/24/apple-patents-smart-shoes-that-feature-embedded-sensors-and-alarms-for-when-you-need-new-ones!, Jan. 24, 2013.

Konttila, A., IEEE Xplore Digital Library, Wireless Weight Measurement Shoes, http://ieeexplore.ieee.org/xpl/login.isp?tp=&arnumber=6098540&url=http%3A%2F%2Fieeexplore.ieee.org%2Fxpls%2Fabs_all.jsp%3Farnumber%3D6098540, Oct. 15-17, 2011.

Meledey, http://www.meledey.com/, Aug. 19, 2015.

Estes, A., Vice Media LLC, Does the World Really Need Smart Silverware?, http://motherboard.vice.com/blog/does-the-world-really-need-smart-silverware, Jan. 7, 2013.

HAPIfork, https://www.hapi.com/product/hapifork, site visited Mar. 23, 2015.

Trew, D., Engadget, HAPILABS introduces HAPIfork (and spoon) smart utensils, brings metrics to your mouthfuls (hands-on), https://www.engadget.com/2013/01/06/hapilabs-introduces-hapifork-and-spoon-smart-utensils-brings/, Jan. 6, 2013.

Zhang, S. et al., Sensors, Detection of Activities by Wireless Sensors for Daily Life Surveillance: Eating and Drinking, pp. 1499-1517, www.mdpi.com/journal/sensors, Mar. 3, 2009.

Choi, C., How 'Smart Teeth' Could Detect Health Habits, http://wwwlivesciencecom/39713smarttoothtrackhealthhabits.html, Sep. 17, 2013.

Dong, Y., Tracking Wrist Motion to Detect and Measure the Eating Intake of Free-Living Humans, Dissertation, May 2012.

Hahn, J., Digital Trends, Bitbite Is an In-Ear Fitness Device That Listens to How Well You're Chewing Your Food, http://www.digitaltrends.com/wearables/bitbitewearableeardevicetellswellyoureeatingchewing/, Nov. 15, 2014.

* cited by examiner

SYSTEM AND METHOD FOR TRACKING THE WEIGHT AND FOOD CONSUMPTION OF A USER

CROSS-REFERENCE TO RELATED APPLICATION

This application claims priority to provisional application 62/175,651 filed on Jun. 15, 2015 and is incorporated by reference in its entirety as if fully recited herein.

TECHNICAL FIELD

Exemplary embodiments of the present invention relate generally to personal electronic devices that assist the user in the maintenance of their health through monitoring their weight and caloric intake.

BACKGROUND AND SUMMARY OF THE INVENTION

Management of a person's weight is an important factor in maintaining that person's health. Unfortunately, with the ready availability of prepackaged foods and frequent distractions from sources such as cell phones, tablets, and televisions, it is not unusual for a person to consume more food and snacks than they realize. What is needed is a way for a person to track their consumption of food and the impact that consumption has on their weight.

In an embodiment of the invention, a sensor may be positioned under a user's feet and may be configured to determine the weight of the user. The sensor may be in electronic communication with a computing device such as, but not limited to, a smartphone, smart watch or tablet. In an embodiment of the invention, the computing device may be configured to track the user's weight over a period of time. In an embodiment of the invention, a user may track their consumption of food through the use of a second sensor mounted on or near a hand they use to eat. The second sensor may keep track of how many times and the frequency with which the user moves their hand from a source of food to the user's mouth. In addition, embodiments of the invention may also be configured to track the user's eating habits using the second sensor. Certain embodiments may be configured to use the tracked weight and eating information to provide feedback to the user to improve that user's behavior with regard to his or her weight and eating habits. As with the first sensor, the second sensor may be in communication with the computing device.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

An exemplary embodiment includes a weight measurement sensor apparatus, a sensor apparatus to detect movement of a user's hand, and an application program that configures a computing device to communicate with the sensors and provide feedback and suggestions to a user of the invention.

Figure 1:
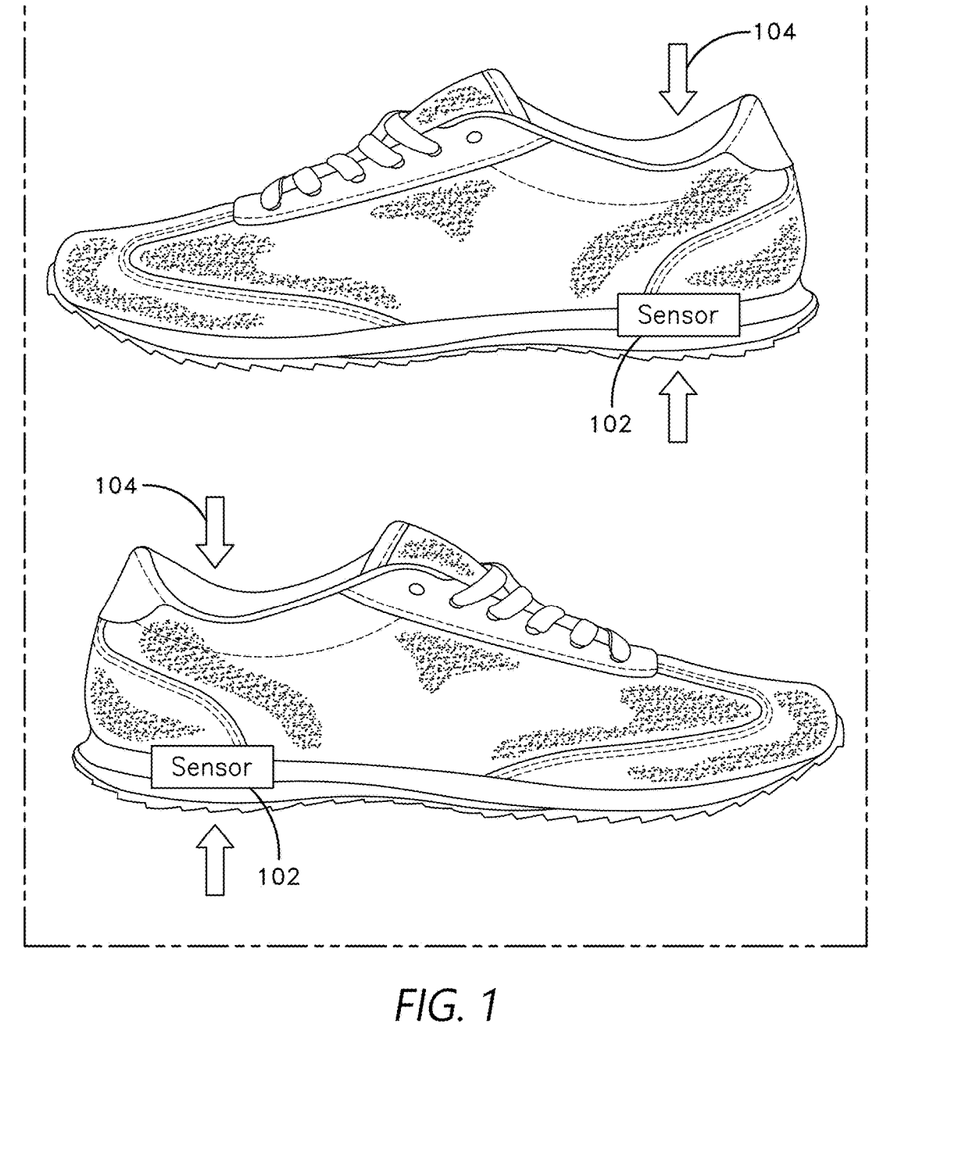
FIG. 1 is a diagram of an embodiment of a sensor apparatus positioned at a pair of shoes.

As is illustrated in FIG. 1, in an embodiment of the invention, a sensor apparatus may be installed in or on a user's shoes. As indicated, the sensors 102 may be mounted in the sole of each shoe. Alternatively, the sensor may be mounted in an insole or between an insert and the bottom surface of the shoe. In order to determine a user's total weight, two sensors may be required, one at each shoe. As is illustrated at 104, each sensor may measure the force applied by a user's foot to the ground upon which that foot rests. In certain embodiments of the invention, each shoe may be equipped with a plurality of sensors to more accurately determine a user's weight. The sensor apparatus may be equipped with circuitry or software instructions to determine conditions in which the user is standing in one place in order to more accurately determine that user's weight.

Figure 2:
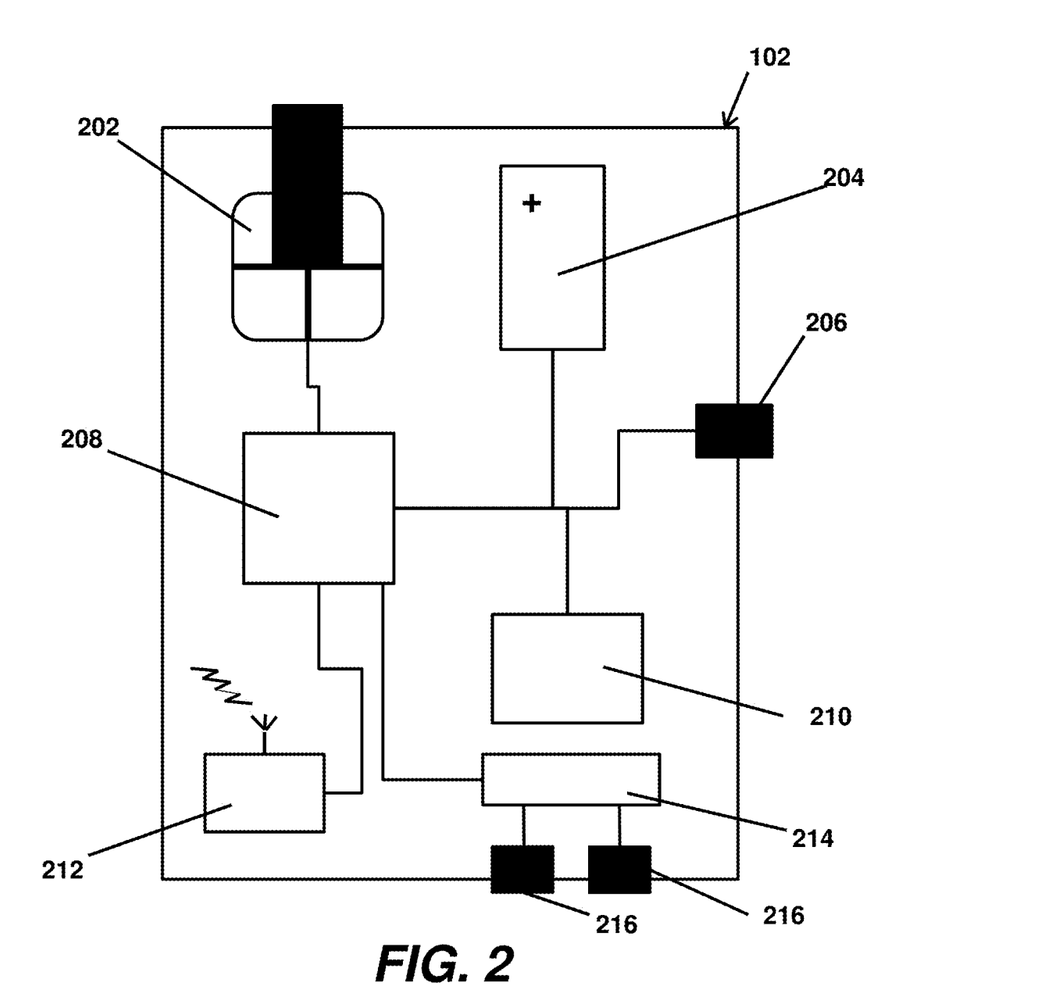
FIG. 2 is a block diagram of a first sensor apparatus.

A diagram of an example sensor apparatus is shown in FIG. 2. As is illustrated, a typical sensor apparatus 102 may comprise at least one pressure sensor 202, a battery 204, a power switch 206, a processor 208, a memory 210, and software instructions. The sensor apparatus may also be equipped with a communications interface 212 for communication between each sensor and also a computerized device. The sensor apparatus 102 may also comprise a body mass index calculator 214 and one or more interface sensors 216. The communications interface 212 may use a wired connection between sensors at the user's left foot and the user's right foot. Wires may also be used from one or both feet to a computerized device. However, a preferred embodiment may use a wireless communications interface between each foot and the computerized device. For example, an embodiment of the invention may utilize a personal area network such as Bluetooth® (Registered Trademark of Bluetooth SIG, Inc.). In order to detect the weight of a user, an embodiment of the invention may sum the weight measured at each foot. As was noted earlier, in an embodiment of the invention, the sensor apparatus installed in or on a user's shoes may determine when the user remains stationary enough for the apparatus to more accurately calculate the user's weight. In addition, the sensor apparatus may be configured to learn the approximate weight of the user in order to ignore variations in the determined weight that might result from conditions such as, but not limited to, the user leaning against an object, sitting in a chair or stool, or carrying objects that might add to the weight measured.

Figure 3:
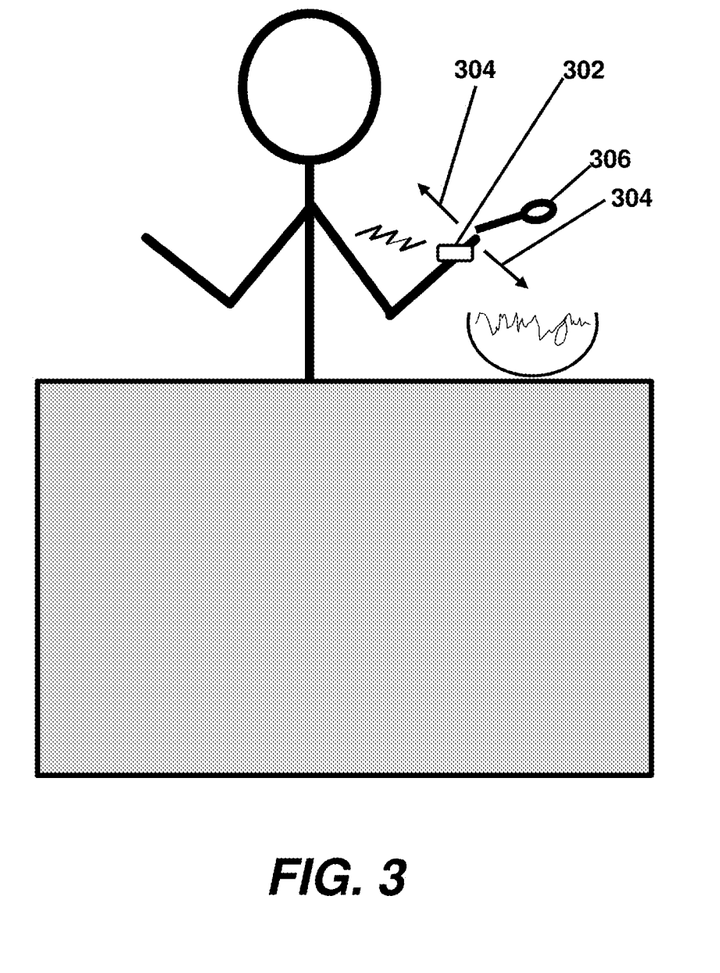
FIG. 3 is an illustration of a sensor apparatus which monitors the user's hand movements.

Referring to FIG. 3, in an embodiment of the invention, a second sensor apparatus 302 may be positioned at or near a user's hand. Because the intended purpose of this sensor apparatus is to detect a user moving food 304 from a location, such as a table, to the user's mouth, the sensor apparatus 302 should be positioned near the hand that is used by the user to place food in the user's mouth. Positioning of the sensor may be accomplished through the use of a watch or bracelet structure that contains the sensor mechanism. Another example embodiment may include a sensor comprised within a ring or other piece of jewelry worn on the user's hand. Still another embodiment may be a sensor contained within an eating utensil 306. Such an embodiment may have the advantage of being more likely to detect movements that were the result of a user placing food into their mouth rather than the user moving their hand near their face. Other embodiments may combine a sensor apparatus positioned at or near a user's hand (without limitation, a watch) with a sensor comprised within an eating utensil.

Figure 4:
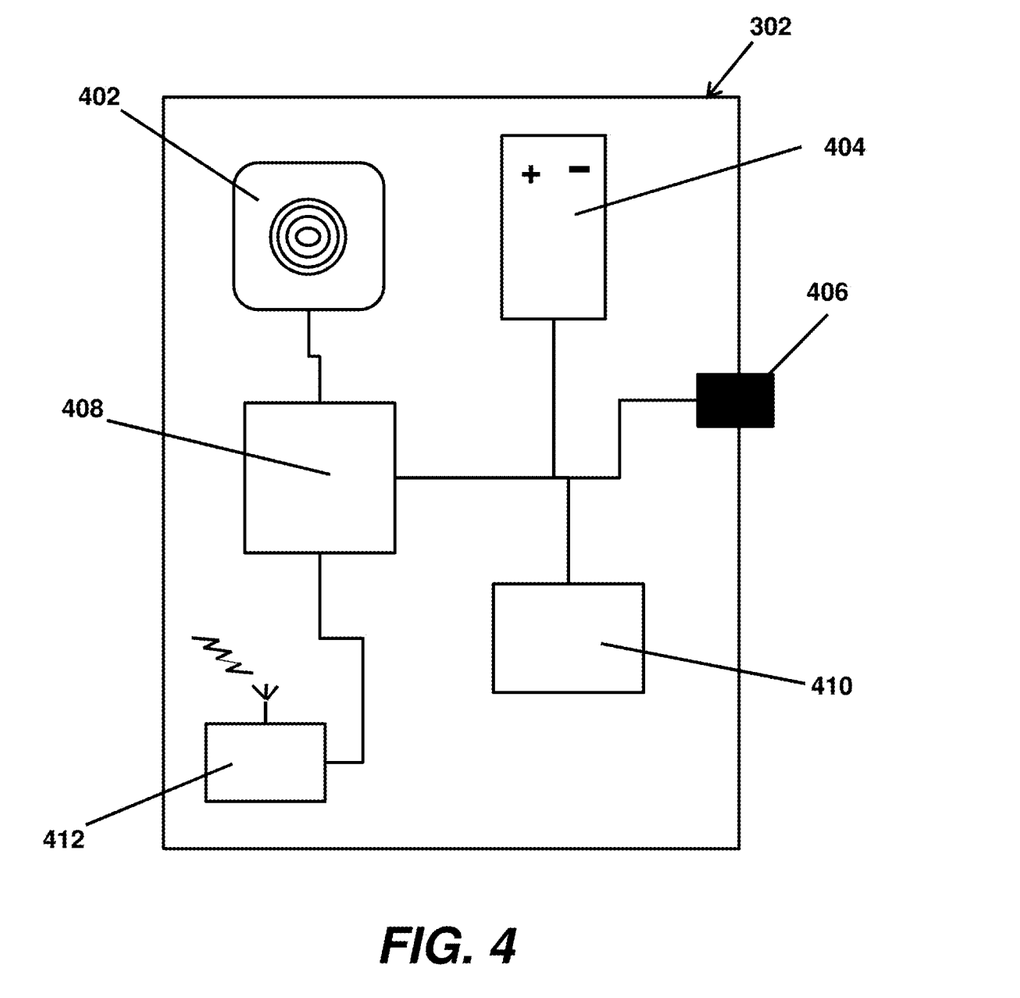
FIG. 4 is a block diagram of a second sensor apparatus.

Referring to the diagram of FIG. 4, in an exemplary embodiment, a second sensor apparatus 302 may comprise a movement or position sensor 402, a battery 404, a power switch 406, a processor 408, a memory 410, and software instructions. The second sensor apparatus may be provided with a communications interface 412 to allow communication with a computerize device. The interface may be formed with a wire connection, or in a preferred embodiment, be wireless. As with the sensor apparatus located at the user's feet, such a wireless connection may be formed using a personal area network such as Bluetooth®.

Figure 5:
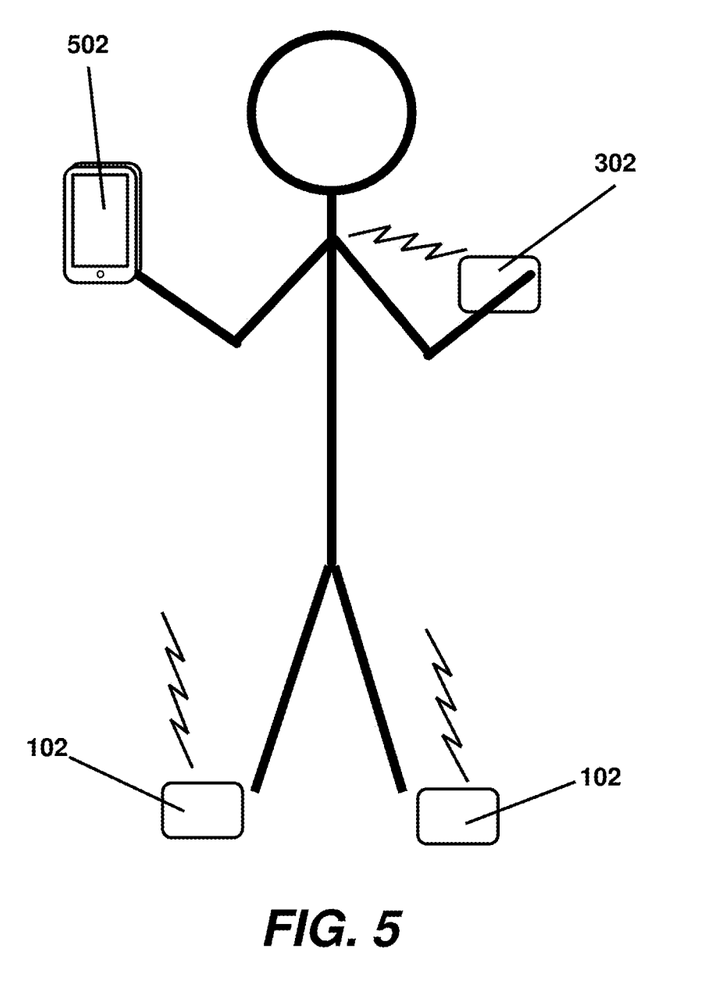
FIG. 5 is an illustration of a user illustrating an embodiment of the invention comprising a first and second sensor in communication with a computing device.
Figure 6:
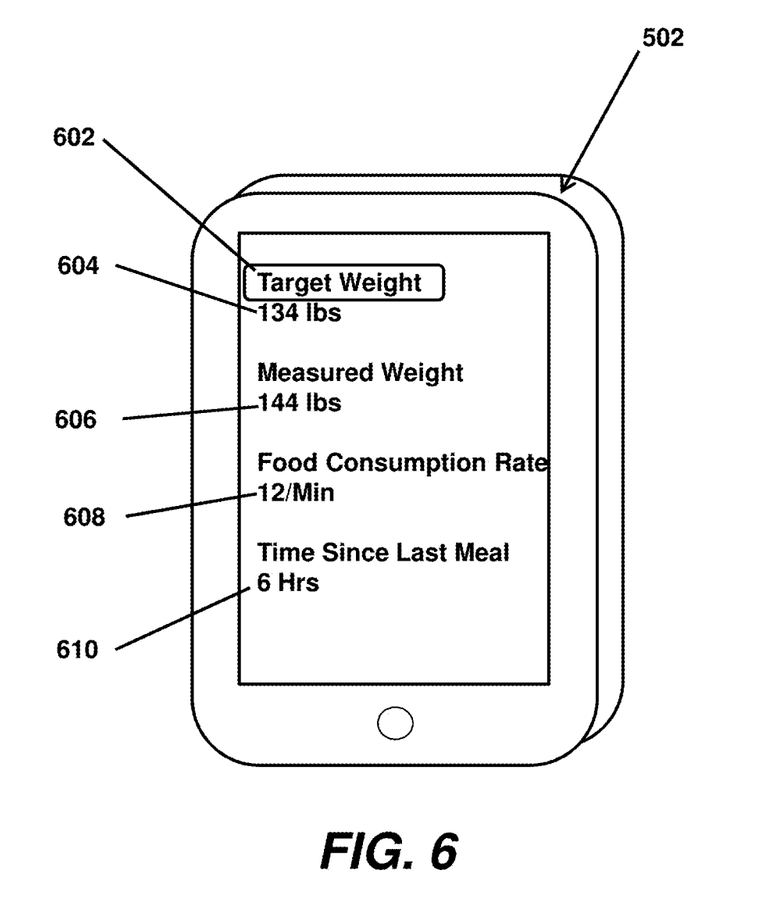
FIG. 6 is an illustration of a user interface used in an embodiment of the invention.

In an embodiment of the invention, a computing device may be configured by software to receive data from the first sensor apparatus and the second sensor apparatus. As is illustrated in FIG. 5, a user of an embodiment of the invention may wear shoes that are provided with a first sensor apparatus 102, wear a second sensor apparatus 302 and provide a computing device 502. As the user stands, the first sensor apparatus 102 may measure the weight of the user and provide that information to the computing device 502. The computing device 502 may be supplied with software instructions that configure the computing device to receive the weight information from the first sensor. The computing device 502 may store the received data and use it to determine an approximate weight of the user. In an embodiment of the invention, the computing device may compare the determined weight of the user over a period of time and use that comparison to determine if the user is gaining weight, losing weight, or remaining predominantly the same. In certain embodiments of the invention, a user may enter a desired target weight. Alternatively, an embodiment of the invention may calculate a target weight based on factors entered by the user. Using the desired or calculated weight, the computing device 502 may determine if the user is losing weight to reach the desired or calculated weight. An example user interface is illustrated in FIG. 6. As is shown, a user may select a control option 602 to select their desired weight 604. The user's measured weight may also be displayed 606.

Referring again to FIG. 3, a user may wear a second sensor apparatus 302 or utensil 306 when eating. The second sensor apparatus 302 or utensil 306 may detect when the user moves food toward their mouth. When such detection occurs, the sensor apparatus 302 or utensil 306 may detect a time when the food reaches the mouth of the user. In other embodiments, the sensor apparatus 302 or utensil 306 may provide an indication to the computing device 502, which performs the determination of time. In an embodiment of the invention, the determined time may be used to measure certain characteristics of the eating process. For example, in an embodiment of the invention, the computing device 502 may be able to calculate how many times the user places food in his or her mouth, how long a period the user spends eating, and the frequency that the user moves food to his or her mouth (a high frequency of movement may indicate that the user is eating too quickly). In the example user interface illustrated in FIG. 6, food consumption rate 608 and the time elapsed since the last detected meal 610 may be displayed.

Figure 7:
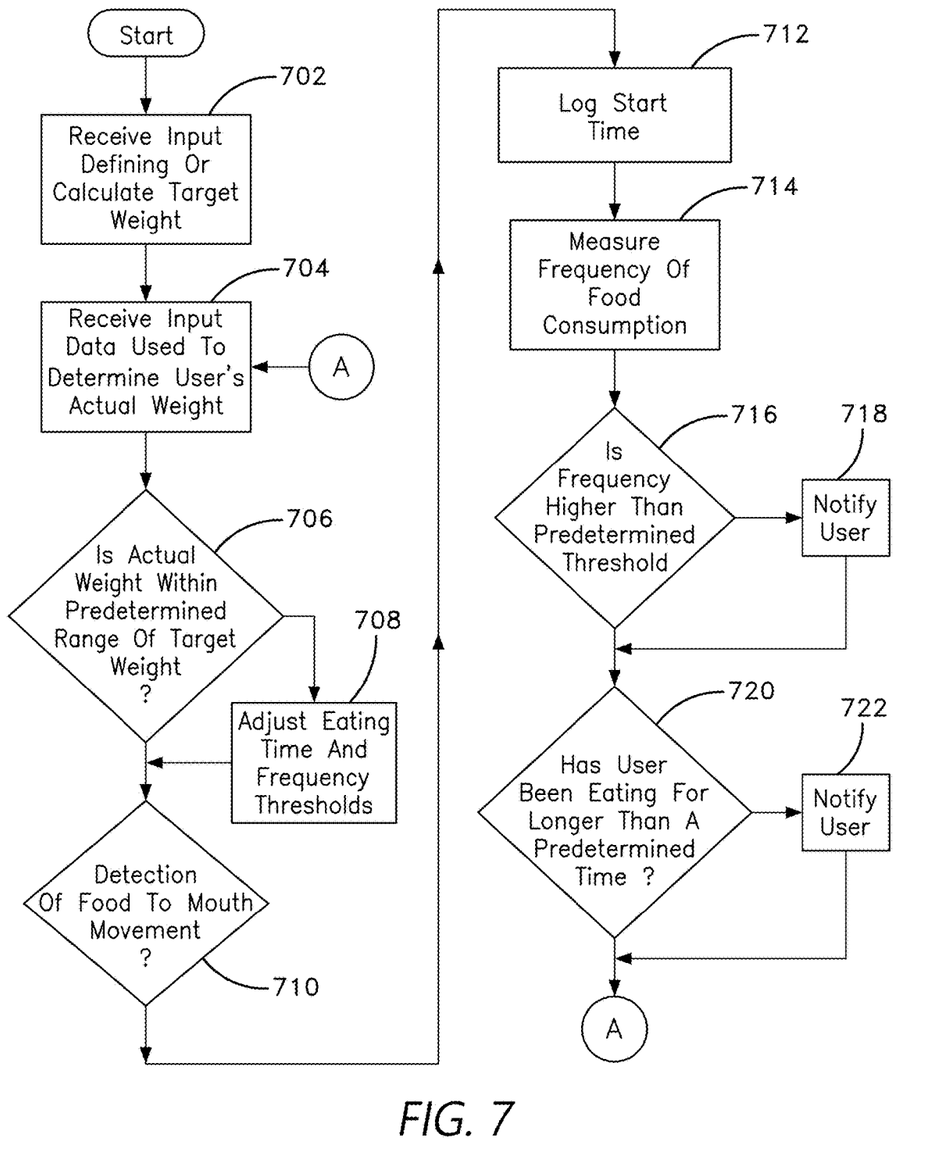
FIG. 7 is a flow chart of the steps used in an embodiment of the invention.
Figure 8:
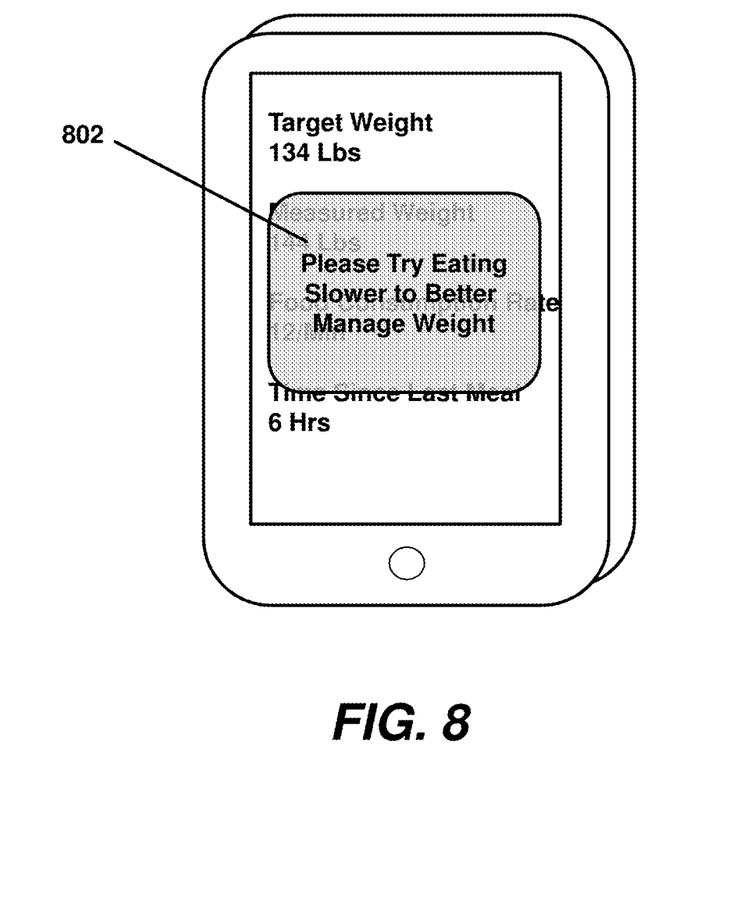
FIG. 8 is an illustration of a user interface used in an embodiment of the invention.

In an embodiment of the invention, the computing device executes software instructions to monitor the user's weight and eating habits and take action if these monitored characteristics exceed predetermined thresholds. In an embodiment of the invention, a range may be calculated based on a percentage of the user's weight and that range may be added to the desired user weight to avoid an excessive amount of feedback when the user's actual weight exceeds the desired weight by only a small amount. An example of the logical steps taken by a computing device executing software instructions according to an embodiment of the invention are illustrated in the flowchart of FIG. 7. As is illustrated, when first configured, a computing device 502 may receive or calculate a target weight for the user 702. In step 704, the computing device 502 may receive information from a first sensor apparatus 102 that indicates the user's weight. The computing device 502 may then determine if the received weight is within a predetermined range of the target weight 706. If the received weight exceeds the predetermined range, an embodiment of the invention may display an indication of that fact to the user. The computing device may adjust setpoints 708 used by the program to values designed to encourage eating behavior conducive to weight loss. After adjusting the program values in step 708, or if the measured weight is within the predetermined range, the computerized device may be configured to receive movement data from the second sensor apparatus in step 710. If the received movement data indicates movement toward the user's face in a manner that suggests food is being eaten, the computerized device may record a start time 712. In certain embodiments of the invention, the computerized device may also measure the time between each movement towards the user's face that suggests food is being eaten 714. The recorded start time and time between movements may be used in certain embodiments of the invention to provide feedback to the user in order to suggest behavior that would be conducive to managing their weight (steps 716 and 718). An illustration of an example user interface is illustrated in FIG. 8. As is shown, a suggestion that a user eats more slowly may be displayed 802. As is illustrated in steps 720 and 722, an embodiment of the invention may use the recorded start time and an actual time to determine if the user has been eating for longer than a predetermined time. If the predetermined time is exceeded, an embodiment of the invention may notify the user of the time in an attempt to modify that user's behavior. In certain embodiments of the invention, the computerized device may be configured to provide suggestions to the user with regard to meal times and food choices. For example, an embodiment of the invention may alert a user if that user has gone for a period of time without eating. Such a time period may lead to an unusually strong sensation of hunger that could result in a user overeating or eating too quickly. By avoiding such conditions, the user may make better food selections, resulting in better health and loss of excess weight.

As described above, in certain embodiments of the invention, data may be transmitted from the first sensor 102 and second sensor 302 or utensil 306 to a computing device 502. In certain embodiments of the invention, the sensors may store such data in memory located within each sensor for later transmission to the computing device. In such a configuration, the sensors may record data without the requirement that a computing device 502 be located such that a communications connection is continuously maintained between the computer device and the sensors (302 or 306).

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for tracking weight and food consumption comprising:
    a first sensor apparatus configured to detect the weight of the user and comprising a first communications interface, wherein the first sensor device is located within an insole which is configured to be interchangeably located within one of a number of the user's shoes;
    a second sensor apparatus configured to detect the user placing food in their mouth and comprising a second communications interface, wherein the second sensor device is located entirely within an eating utensil selected from the group consisting of: a fork, a spoon, and a knife;
    a computerized interface device in communication with the first and second communications interface, said computerized interface device comprising a display device, a user input system, and software, the software comprising instructions, which when executed by the computerized interface device, cause the device to:
    determine a target user weight;
    retrieve a measured user weight from the first sensor apparatus;
    determine if the retrieved user weight is greater than the target user weight by more than a predetermined amount, the target user weight plus the predetermined amount defining an upper boundary;
    store eating characteristic setpoints based on the determination of the user's weight and the upper boundary;
    receive a signal from the second sensor device that represents the sensor detecting the user moving a foodstuff to the user's mouth;
    determine a frequency of eating;
    determine an elapsed time of eating;
    determine if the frequency of eating exceeds a first eating characteristic setpoint and display a first message on the display device if the frequency of eating exceeds the first eating characteristic setpoint; and
    determine if the elapsed time of eating exceeds a second eating characteristic setpoint and display a second message on the display device if the elapsed time of eating exceeds the second eating characteristic setpoint.

2. The system of claim 1, wherein the target user weight is determined by executing software instructions on the computerized interface device, which cause the computerized interface device to:
    display on the display device, a prompt to enter a user's height and gender;
    receive an input corresponding to the user's height;
    receive an input corresponding to the user's gender; and
    determine a suggested weight for the user based upon user input corresponding to the user's gender and user input corresponding to the user's height.

3. The system of claim 2, wherein the determination of the suggested weight for the user is determined by executing software instructions on the computerized interface device, which cause the computerized interface device to calculate a weight according to an ideal estimated body mass index for user input corresponding to the user's height and gender.

4. The system of claim 1, wherein the target user weight is determined by executing software instructions on the computerized interface device, which cause the computerized interface device to:
    display on the display device, a prompt to enter the user's desired weight; and
    receive an input corresponding to the user's desired weight.

5. The system of claim 1, wherein the predetermined amount is a percentage of the determined target weight.

6. The system of claim 1, wherein the eating characteristic setpoints are determined by executing software instructions on the computerized interface device which cause the computerized interface device to store a target time period corresponding to a duration of a meal where the target time is varied according to the time of day at which movements corresponding to a user eating are detected and where the target time is reduced when the user's measured weight exceeds the upper boundary.

7. The system of claim 1, wherein the eating characteristic setpoints are determined by executing software instructions on the computerized interface device which cause the computerized interface device to store a target frequency of eating corresponding to the amount of time between the receipt of signals from the second sensor apparatus.

8. The system of claim 1, wherein the software instructions further comprise instructions, which when executed by the computerized interface device, cause the computerized interface device to display, on the display device, a body mass index of the user calculated using information from a body mass index calculator comprised by the first sensor apparatus and physical information provided by the user.

9. A method of alerting a user if their eating behavior is negatively impacting their weight comprising the steps of:
    providing a weight sensor located within an insole;
    placing the insole into one of a number of a user's shoes;
    determining a target user weight;
    receiving an actual user weight from the weight sensor located at the insole placed within the user's current pair of shoes;

determining if the actual weight exceeds the target user weight;

adjusting a plurality of eating characteristic setpoints and storing those setpoints in a computerized interface device;

receiving by the computerized interface device, user eating characteristic data from a food movement sensor, wherein said food movement sensor is located within an eating utensil selected from the group consisting of: a fork, a spoon, and a knife;

comparing the received eating characteristic data to the eating characteristic setpoints; and alerting the user that the received eating characteristics data exceeds the eating characteristic setpoints.

10. The method of claim 9, wherein the step of receiving user eating characteristic data comprises the substeps of:

receiving a signal from the food movement sensor device that represents the food movement sensor detecting the user moving a foodstuff to the user's mouth, wherein the step of comparing the received eating characteristic data comprises the substeps of:

determining a frequency of eating;

determining an elapsed time of eating;

determining if the frequency of eating exceeds a frequency of eating setpoint; and determining if the elapsed time of eating exceeds a duration of eating setpoint.

11. The method of claim 9, wherein the step of determining a target user weight comprises the substeps of:

displaying on a display device of the computerized interface device, a prompt to enter the user's height and gender;

receiving at the computerized interface device, user input corresponding to the user's height;

receiving at the computerized interface device, user input corresponding to the user's gender; and determining a suggested weight for the user based upon the user input corresponding to the user's gender and the user input representing the user's height.

12. The method of claim 11, wherein the determination of the suggested weight for the user comprises the substep of calculating a weight according to an ideal estimated body mass index for the user input corresponding to the user's height and the user input representing the user's gender.

13. The method of claim 9, wherein the step of determining of a target user weight comprises the substeps of:

displaying on a display device of the computerized interface device, a prompt to enter the user's desired weight; and receiving at the computerized interface device, an input corresponding to the user's desired weight.

14. The method of claim 9, wherein the step of adjusting a plurality of eating characteristic setpoints and storing those setpoints comprises the substeps of:

storing a target time period corresponding to a duration of a meal where the target time is varied according to the time of day at which user eating characteristic data from a food movement sensor are detected and where the target time is reduced when the user's measured weight exceeds the determined target weight plus a predetermined amount.

15. The method of claim 9, wherein the step of adjusting a plurality of eating characteristic setpoints and storing those setpoints comprises the substeps of:

storing a target frequency of eating which corresponds to the amount of time between the receipt of signals from the food movement sensor.

16. The method of claim 9, wherein the step of alerting the user that the received eating characteristics data exceeds the eating characteristic setpoints comprises the substep of displaying, at a user interface of the computerized interface device, a message indicating that the user should modify their eating behavior, the message selected from a list consisting of: a notification that the user has been eating for too long of a time period and a notification that a user is consuming food too rapidly.

17. A system for tracking weight and food consumption comprising:

an insole configured to be interchangeably located within one of several shoes of a user;

a first sensor apparatus located within the insole and comprising a first communications interface, wherein said first sensor apparatus is configured to detect the weight of the user;

an eating utensil selected from a list consisting of: a fork, a spoon, and a knife;

a second sensor apparatus located entirely within the eating utensil, the second sensor apparatus comprising a wireless communications interface, said second sensor configured to detect the user placing food in their mouth;

a computerized interface device in communication with the first and second communications interface, said computerized interface device comprising a display device, a user input system, a wireless data receiver, and software, the software comprising instructions, which when executed by the computerized interface device, cause the device to:

determine a target user weight where such determination is performed by calculating an ideal weight using a received user height and gender;

retrieve a user weight from the first sensor apparatus;

determine if the retrieved user weight is below an upper boundary of the target user weight, where the upper boundary is determined by taking a predetermined percentage of the user weight and adding the result to the target weight, and where the software causes the computerized interface device to adjust eating characteristics setpoints where such setpoints comprise a frequency of food movement to the user's mouth and a duration of eating;

retrieve a measurement from the second sensor device that represents the sensor detecting the user moving a foodstuff to the user's mouth;

initialize a timer and record a time corresponding to the time at which the second sensor detected the user moving the foodstuff to the user's mouth;

receive a second measurement representing the user moving the second sensor to the user's mouth with the foodstuff;

determine a frequency of eating from a measurement of the time period elapsed between the detection of the user moving the foodstuff to their mouth and the second measurement;

determine an elapsed time of eating by measuring the time from a first detection of the user moving the foodstuff to their mouth and a determination that such movements have stopped;

determine that the frequency of eating exceeds a first eating characteristic setpoint and display a first message on the display device where the first message instructs the user to slow their rate of food consumption; and determine that time of eating exceeds a second eating characteristic setpoint and display a second message on the display device where the second message instructs the user to stop eating.

* * * * *